United States Patent
Wallace et al.

(10) Patent No.: US 11,066,919 B2
(45) Date of Patent: Jul. 20, 2021

(54) METHOD AND APPARATUS FOR MEASURING WEAR ON SUCKER ROD GUIDES

(71) Applicant: Optimum Innovation & Logistics, LLC, Spring Branch, TX (US)

(72) Inventors: Eric Wallace, Spring Branch, TX (US); David Pena, San Antonio, TX (US); Albert Munsinger, Boerne, TX (US)

(73) Assignee: Optimum Innovation & Logistics, LLC, Spring Branch, TX (US)

( * ) Notice: Subject to any disclaimer, the term of this patent is extended or adjusted under 35 U.S.C. 154(b) by 186 days.

(21) Appl. No.: 16/514,540

(22) Filed: Jul. 17, 2019

(65) Prior Publication Data
US 2021/0017851 A1 Jan. 21, 2021

(51) Int. Cl.
| E21B 47/00 | (2012.01) |
| G01B 21/10 | (2006.01) |
| E21B 19/00 | (2006.01) |
| E21B 17/00 | (2006.01) |
| E21B 33/08 | (2006.01) |
| E21B 43/12 | (2006.01) |

(52) U.S. Cl.
CPC ............ *E21B 47/00* (2013.01); *E21B 17/006* (2013.01); *E21B 19/00* (2013.01); *E21B 43/126* (2013.01); *G01B 21/10* (2013.01); *E21B 33/08* (2013.01)

(58) Field of Classification Search
CPC ................................ E21B 33/08; G01B 21/10
See application file for complete search history.

(56) References Cited

U.S. PATENT DOCUMENTS

| | | | | |
|---|---|---|---|---|
| 1,747,592 A | * | 2/1930 | Morlang | E21B 33/08 277/323 |
| 1,773,137 A | * | 8/1930 | Fuller | E21B 33/08 15/220.4 |
| 1,825,605 A | * | 9/1931 | Reed | E21B 33/08 166/93.1 |
| 1,840,334 A | * | 1/1932 | Schuster | E21B 33/08 15/220.4 |
| 1,868,794 A | * | 7/1932 | Fuller | E21B 33/08 277/562 |
| 2,163,007 A | * | 6/1939 | O'Dell | E21B 33/08 166/82.1 |
| 2,328,127 A | * | 8/1943 | Crickmer | E21B 33/08 277/343 |
| 2,855,564 A | * | 10/1958 | Irwin | G01N 27/9006 324/242 |
| 2,866,217 A | * | 12/1958 | Dean | F04B 53/144 15/220.4 |
| 2,937,894 A | * | 5/1960 | Martin | E21B 33/08 251/1.3 |
| 3,071,796 A | * | 1/1963 | Waldrop | E21B 33/08 15/220.4 |
| 3,958,049 A | * | 5/1976 | Payne | E21B 41/02 427/327 |

(Continued)

*Primary Examiner* — Blake E Michener
(74) *Attorney, Agent, or Firm* — Gunn Lee & Cave PC

(57) ABSTRACT

A method and apparatus is shown for measuring diameter of sucker rods during reworking of an oil well. Diameters are compared to known data tables to determine if a sucker rod should be replaced. If undue wear has occurred to the guides, the sucker rod will be replaced. If wear is excessive, additions guides will be added to the replacement sucker rod.

7 Claims, 6 Drawing Sheets

(56) References Cited

U.S. PATENT DOCUMENTS

| | | | | |
|---|---|---|---|---|
| 4,629,985 A * | 12/1986 | Papadimitriou | ...... | E21B 17/006 324/227 |
| 5,150,751 A * | 9/1992 | Burton | ............ | E21B 33/08 166/81.1 |
| 5,217,069 A * | 6/1993 | Badon | ............ | E21B 33/08 15/220.4 |
| 6,580,268 B2 * | 6/2003 | Wolodko | ........ | E21B 47/009 324/240 |
| 7,346,455 B2 * | 3/2008 | Ward | ............ | E21B 43/127 702/6 |
| 7,571,054 B2 * | 8/2009 | Newman | ........ | E21B 17/00 702/6 |
| 2005/0267686 A1 * | 12/2005 | Ward | ............ | E21B 43/127 702/6 |
| 2015/0136384 A1 * | 5/2015 | Stachowiak, Jr. | ...... | E21B 17/10 166/105 |
| 2019/0346340 A1 * | 11/2019 | Martin | ........ | E21B 47/017 |
| 2020/0190967 A1 * | 6/2020 | Gooneratne | ...... | G01N 21/8851 |

* cited by examiner

METHOD AND APPARATUS FOR MEASURING WEAR ON SUCKER ROD GUIDES

BACKGROUND OF THE INVENTION

1. Field of the Invention

This invention relates to sucker rods, sucker rod guides, couplings, and more particularly to a method and apparatus for measuring wear of sucker rods, sucker rod guides and couplings while being pulled from a producing oil well.

2. Description of the Prior Art

After an oil well has been producing for a period of time, the well may need to be reworked. This may be caused my normal wear during production. Another reason may be caused by well deterioration or changing reservoir conditions. An example of changing reservoir conditions may be decreased production over time.

A completed oil well using sucker rods for artificial lift that has a sucker rod string that extends from a surface down to a targeted depth to pull from the oil reservoir with the sucker rod being moved up and down by a walking jack. Sucker rods normally range from 1⅛" to ⅝" in diameter and have couplings that range from 2.1875" to 1.250" in diameter. (Example: A 1" rod with a slim hole coupling of an outside diameter of 2.00") Because oil wells are not drilled straight down, the sucker rods normally have guides there around that are approximately 2.335 inches in diameter to prevent wear to the production tubing caused by on the couplings or sucker rods.

Currently, if an oil well needs to be reworked, the well will be killed and a work-over rig moved in place over the oil well. Thereafter, the sucker rods will be removed by pulling them up in the derrick of the workover rig. As the sucker rods are being removed, an operator visually looks at the guides on the sucker rod to determine if there has been undue wear. This visual inspection is very haphazard and may miss significant areas of wear in the sucker rod, couplings or guides.

In many wells, the operator does not know exactly what is in an oil well as far as sucker rod diameter, coupling diameter or size of guides. An accurate measurement of what is located inside the well and at what depth it is located would be very useful.

Normal maintenance for a producing oil well that has reduced or no production will result in the sucker rods being pulled every so often and being inspected to verify there is no undue wear. If this is not done, there could be catastrophic failure of an oil well, which would require expense remedial action. Also, paraffin that accumulates in an oil well can create major problems. When pulling the sucker rods out of an oil well, the paraffin needs to be removed. To some degree, paraffin can be removed by heating the oil well with hot oil or hot water so the paraffin will turn to liquid before removing the sucker rods.

SUMMARY OF THE INVENTION

It is an object of the present invention to measure the size of the sucker rod, coupling and guides as sucker rods are removed from an oil well.

It is yet another object of the present invention to compare the diameter of the sucker rod guides with what should be the diameter to determine if the sucker rod should be replaced.

It is still another object of the present invention to provide an optical scanner that scans the sucker rod, couplings and guides as each such sucker rod is removed from the well, data from the scanner being fed into a program to determine if undue wear has occurred.

It is still another object of the present invention to provide a way for removing paraffin or other substance from the sucker rod as it is being pulled before making measurements of the sucker rod, couplings and sucker rod guides.

It is still another object of the present invention to provide a complete system for measuring sucker rods, couplings and sucker rod guides as they are being removed from a well and comparing the measurements received with a known database to determine if undue wear has occurred on the sucker rod guides.

As the sucker rods are pulled through a sucker rod scanner, scanner heads measure the diameter of the couplings, sucker rods, and sucker rod guides. The profile of each sucker rod, couplings and guides is established. The profile of the sucker rod is then analyzed and compared to standard tables to determine the percentage wear on the sucker rods, guides and couplings. If the percentage wear on the guides is unacceptable, then the sucker rod is laid down and replaced. Thereafter, the process continues for the next sucker rod.

DESCRIPTION OF THE PREFERRED EMBODIMENT

The present invention can be better understood in connection with the below description as applied to the drawings.

Figure 1:
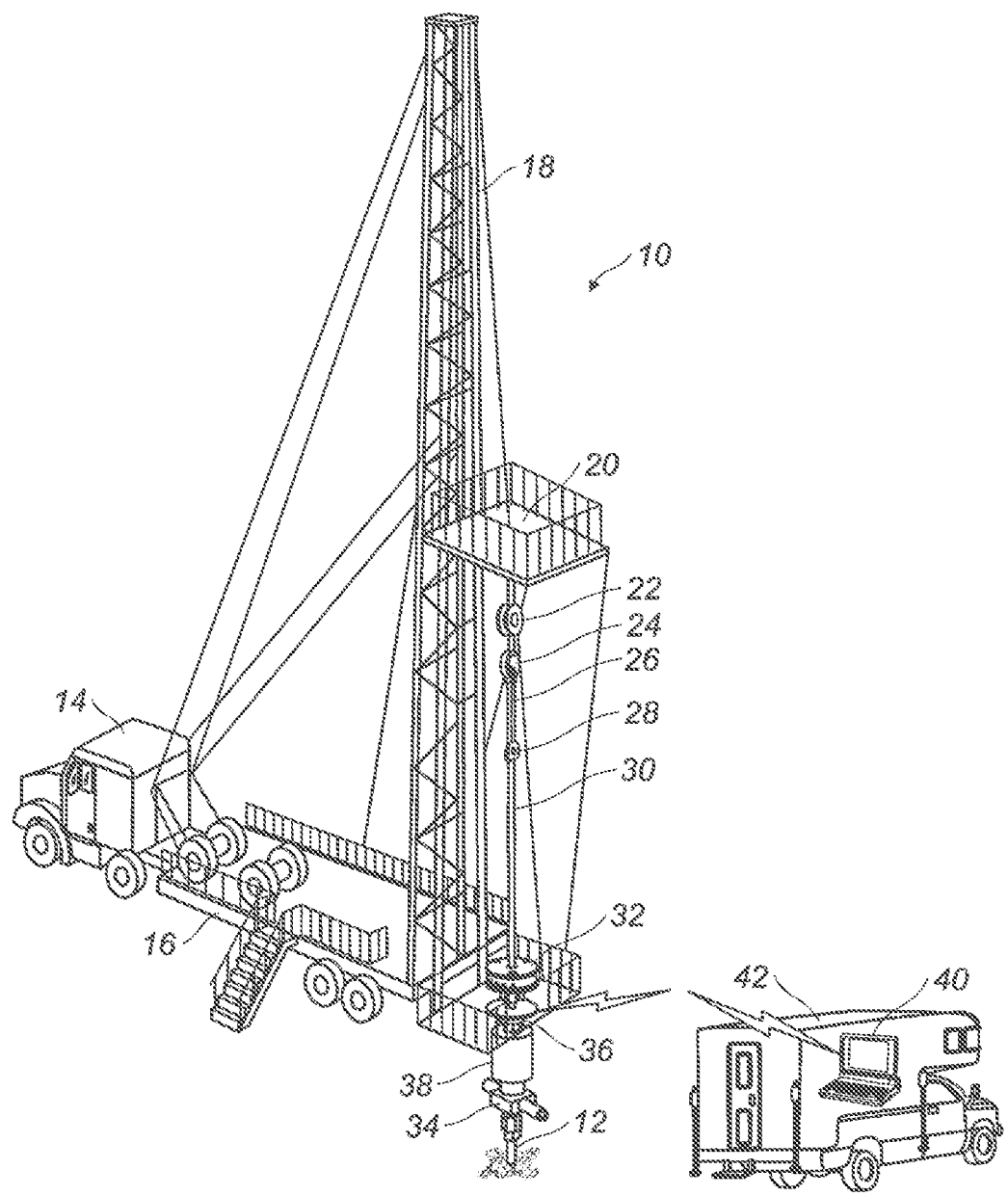
FIG. 1 is a pictorial perspective view of a workover rig over an oil well that has removed sucker rods through the rod scanner of the present invention.

Referring now to FIG. 1, the workover rig 10 is shown over oil well 12. The workover rig 10 includes a truck 14, trailer 16 and derrick 18. On derrick 18 is located a tubing board 20 under which is located pulleys 22 and 24. The lower pulley 24 connects to hook 26, the lower end of which connects to the rod elevator 28. The lower end of the rod elevator 28 connects to sucker rod 30.

Sucker rod 30 extends down through rod scanner 32, blowout preventer 34 and secondary blowout preventer 36. There may even be a fixed blowout preventer 38. A computer 40 is located in van 42 or at any other suitable location out of the weather. The computer 40 communicates either by hard wire or by radiated signal with the rod scanner 32 as will be subsequently described in more detail.

Figure 2:
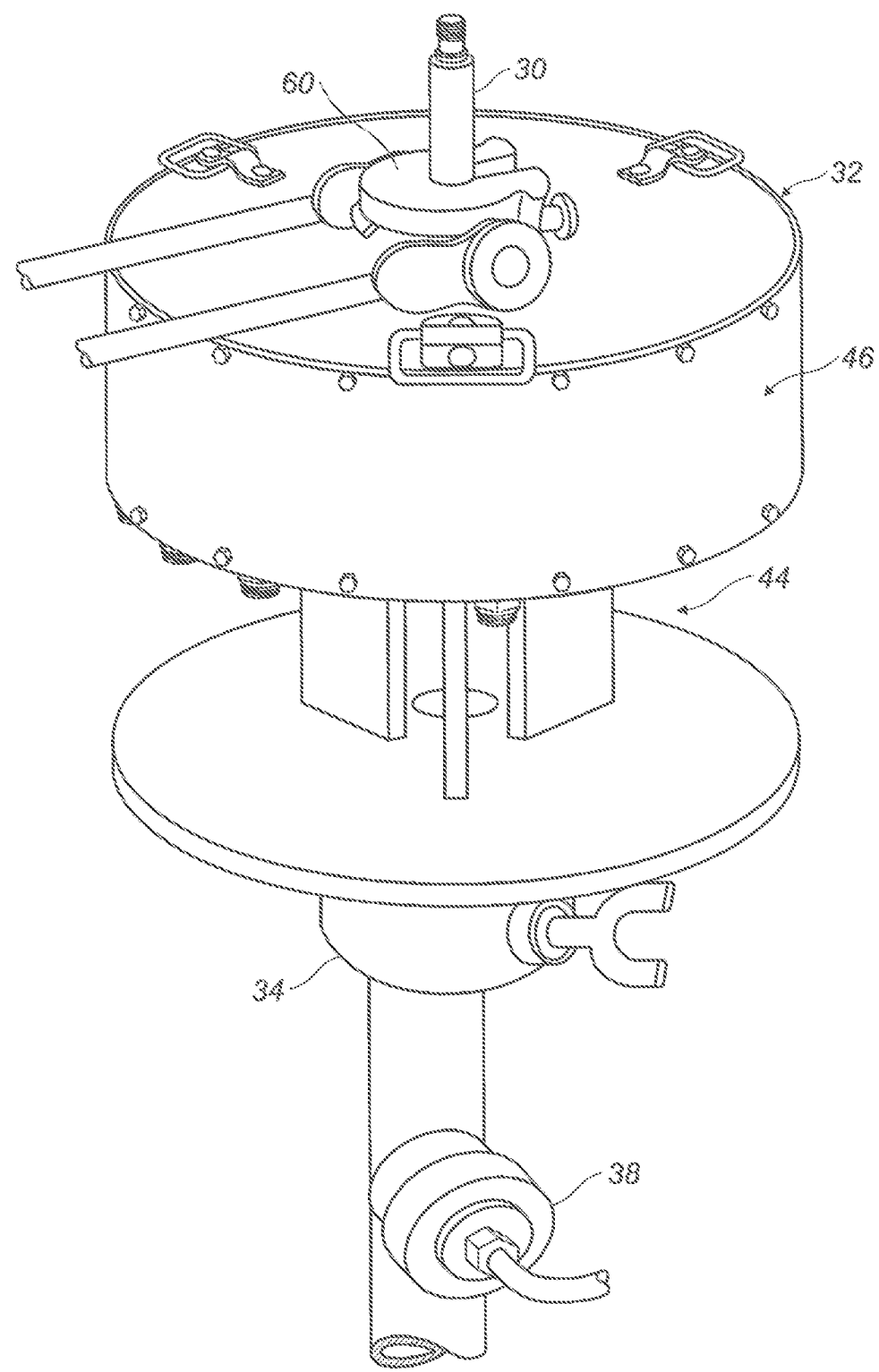
FIG. 2 is a perspective view of the sucker rod scanner on the oil well.

Referring now to FIG. 2, a perspective view of the rod scanner 32 is shown. The rod scanner 32 has a lower cleaning section 44 and an upper instrument housing 46. Both the lower cleaning section 44 and the upper instrument housing 46 make up the rod scanner 32.

At the top of the rod scanner 32 is rod elevator 60. Below the rod scanner 32 is blowout preventer 34 and fixed blowout preventer 38. The difference in shape for blowout preventer 34 and fixed blowout preventer 38 as shown in FIG. 2 from that previously discussed in FIG. 1 is because blowout preventers may take on many different sizes or shapes.

Figure 3:
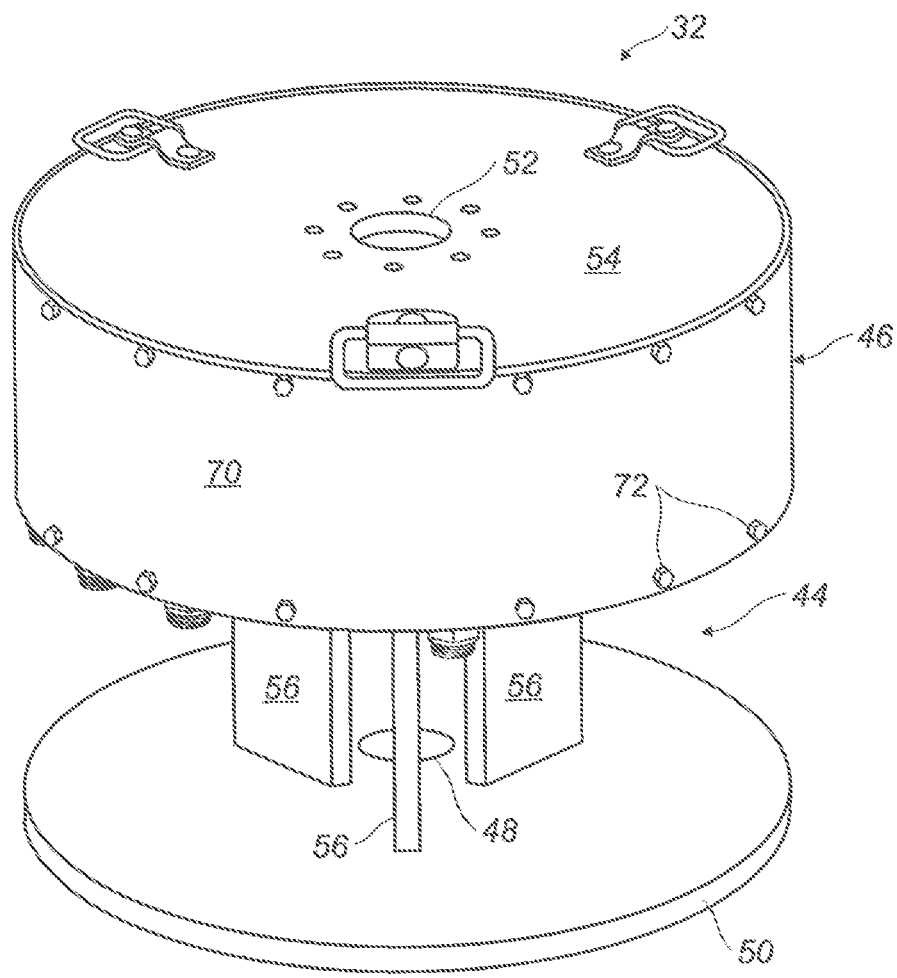
FIG. 3 is an isolated perspective view of the sucker rod scanner.
Figure 4:
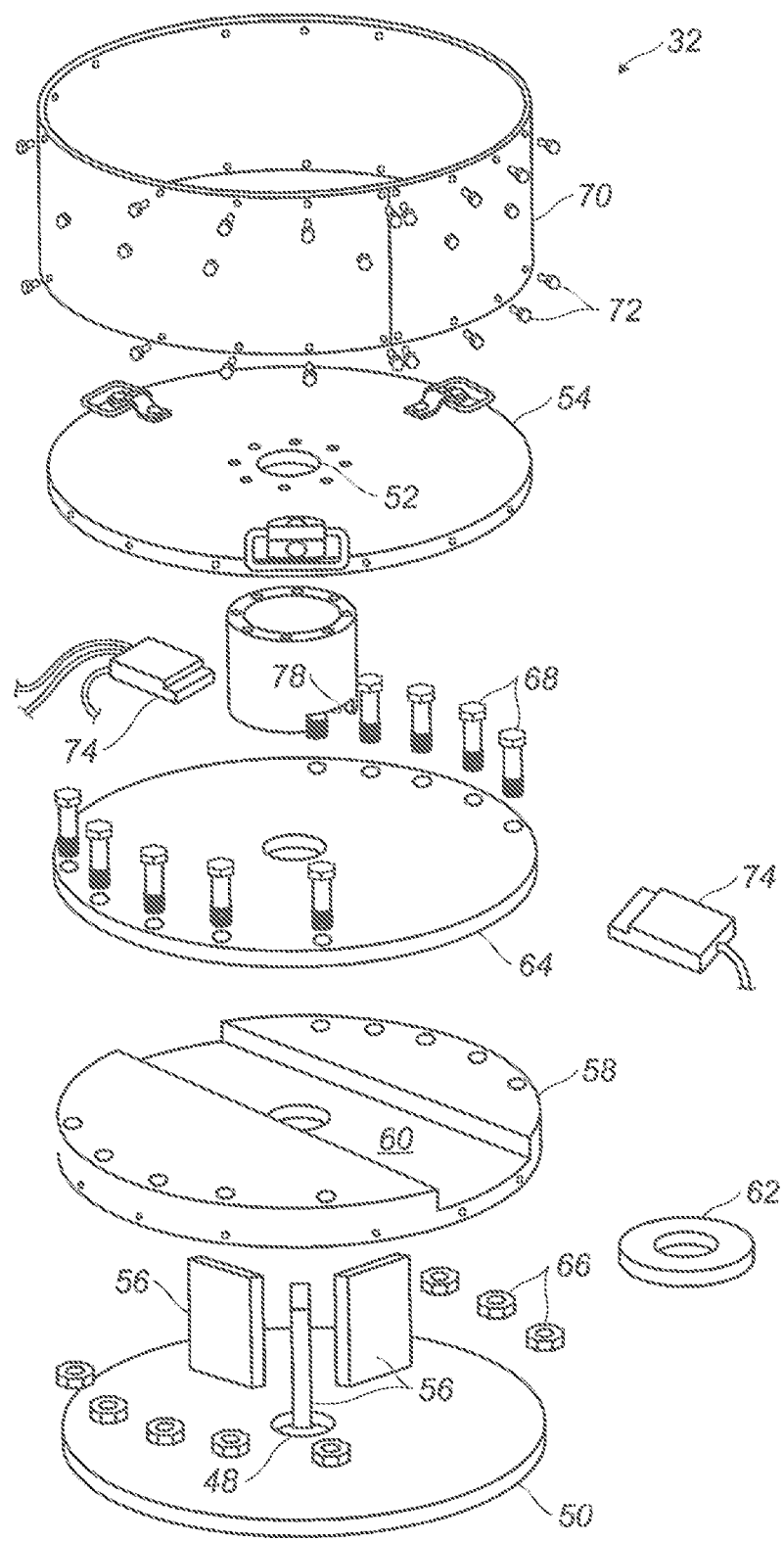
FIG. 4 is an exploded perspective view of the sucker rod scanner.

Referring now to FIGS. 3 and 4, the rod scanner 32 is shown in more detail. The sucker rod 30 (see FIG. 1) is pulled up through the hole 48 in the base plate 50 and out the hole 52 in the top plate 54. Spacers 56 are located between face plate 50 and wiper containment plate 58. Wiper rubber channel 60 is provided in the top of the wiper rubber containment plate 58 to receive the wiper rubber 62 therein. As the sucker rod 30 is pulled up through the wiper rubber 62, any debris on the sucker rod 30 is removed in the lower cleaning section 44. Paraffin that may accumulate on the sucker rod 30 is the most common type of debris that will accumulate on the sucker rod 30. It is important that the sucker rod 30 be as clean as possible. The spacers 56 may be attached to face plate 50 and wiper containment plate 58 by any convenient means such as welding.

The wiper rubber 62 is held in wiper rubber channel 60 by micrometer face place 64, and by nuts 66 and bolts 68. The pressure on the micrometer face plate 64 on wiper rubber 62 prevents it from moving. As paraffin or other materials are scraped off the sucker rod 30, the upper rubber 62 accumulates paraffin in the lower cleaning section 44.

The upper instrument housing 46 is protected by cylindrical cover 70 held in place by screws 72.

Figure 5:
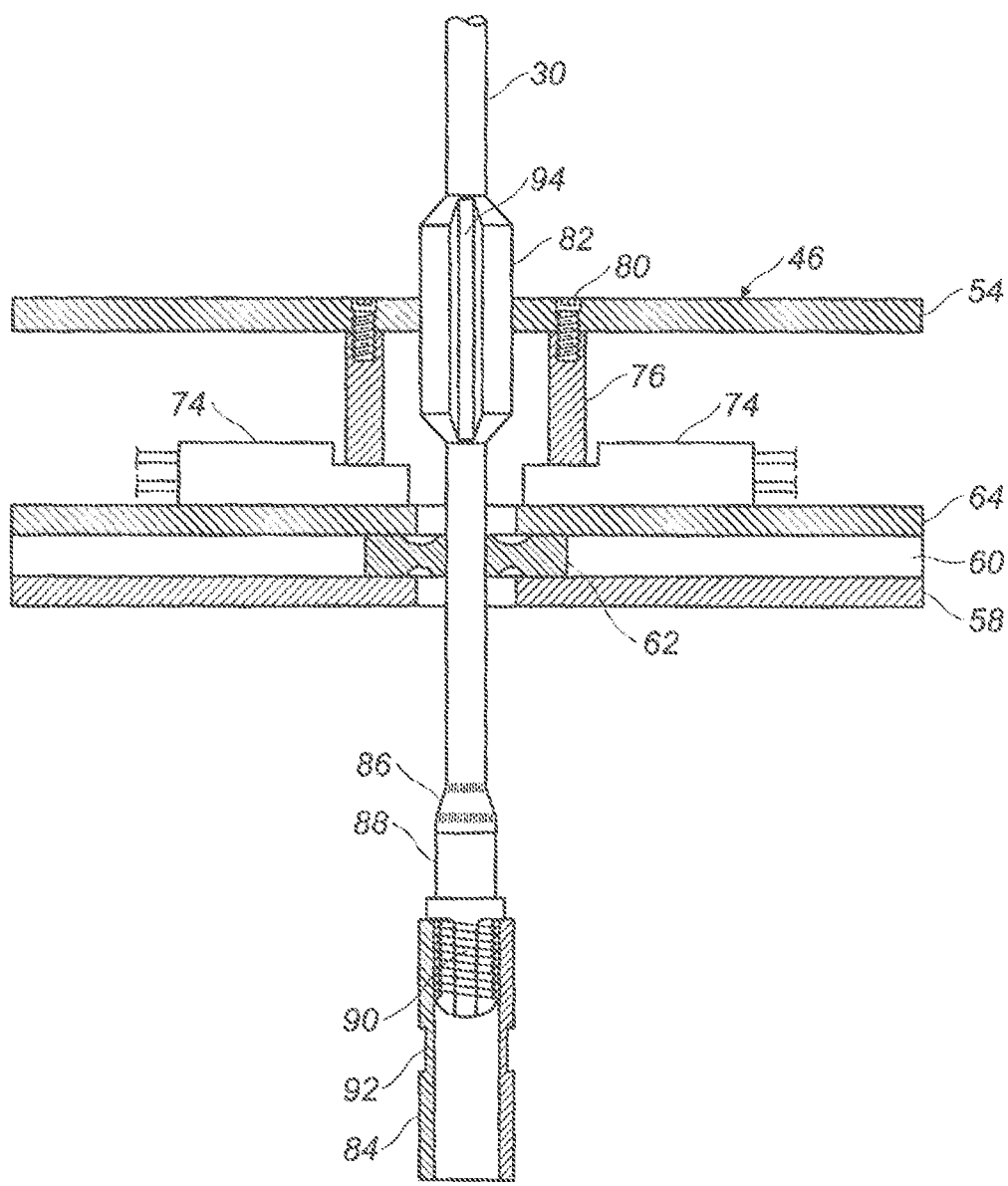
FIG. 5 is a partial sectional view of the sucker rod scanner.

Referring now to FIGS. 4 and 5 in combination, the contents of the upper instrument housing 46 will be explained in detail. Sensor heads 74 are mounted on micrometer face plate 64 and held in position by measuring device barrel 76. Slots 78 receive the sensor heads 74 therein. The press measuring device barrel 76 holds the sensor heads 74 firmly against micrometer face plate 64. The measuring device barrel 76 is held in position by screws 80. The sensor heads 74 communicate with the computer 40 located in the van 42 (see FIG. 1) either by hard wire connection or by telemetry.

The sucker rod 30 has thereon sucker rod guide 82 and coupling 84. The sucker rod 30 has a transition 86 where it expands to wrench square 88 and ends in sucker rod threads 90. Sucker rod threads 90 are threadably received into coupling 84. Coupling 84 also has wrench flat area 92 on either side thereof.

The sucker rod guide 84 is formed from a plastic and molded onto the sucker rod 30. Channels 94 are provided in sucker rod guides 82 to allow oil flow there through during production.

Most producing oil wells in the United States use 2⅞" tubing for production, which 2⅞" tubing has inside diameter of 2.44 inches. Typically, the sucker rod 30 will have a diameter of 1 inch to ⅝ inch, coupling 84 can have a diameter of 2.1875 to 1.250 inches and sucker rod guide 82 would have a diameter of 2.335 inches. The purpose of the guides 82 is to prevent wear from occurring on the coupling 84 and transferring wear to the production tubing that can cause loss of production. For example, if the sucker rod guide 82 wears from 2.335 down to 2.0 inches, there will be undesirable wear on the coupling 84. When the sucker rods 30 are pulled if there is wear on the sucker rod guide 82, if much as 50% of the 0.335 inch tolerance is worn away, the sucker rod 32 will need to be replaced. If there is wear by as much 70% of the 0.335 inches, then more guides are needed in that area to prevent excess wear.

Figure 6:
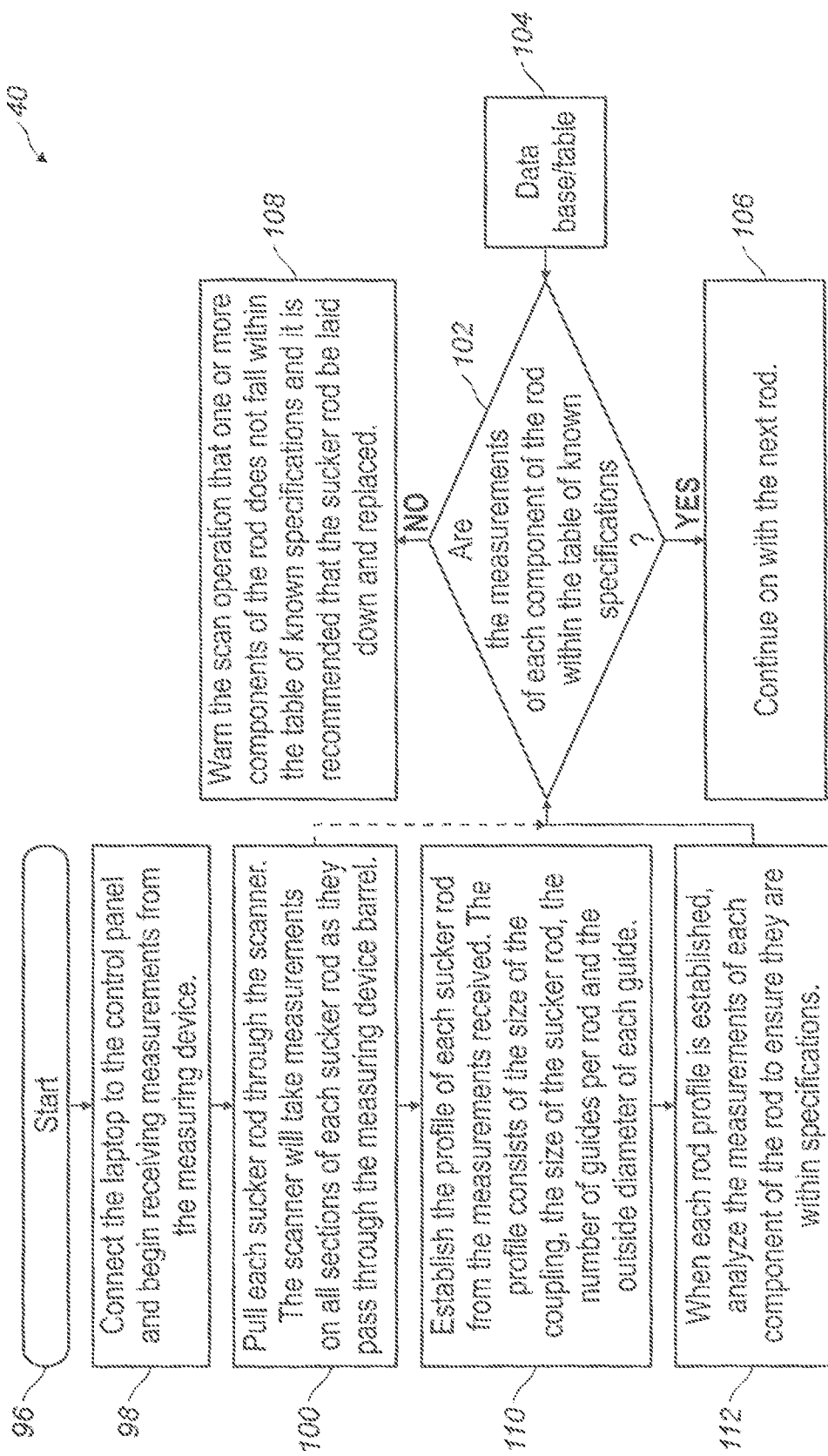
FIG. 6 is a block flow diagram of the computer program used with the rod scanner.

It is has been found that most smaller operators of oilfield production do not know the size of sucker rods 32, couplings 84 or sucker rod guides 82 that are used in a particular well. Therefore, it is desirable when pulling sucker rods 32 out of such a well to be able to determine the diameters of the sucker rods 32, couplings 84 and sucker rod guides 82. The sensor heads 74, shown in FIG. 5, project a signal against the sucker rod 30, sucker rod guide 82 and couplings 84 as they are being removed from the oil well 12. The signal being received is fed into computer 40 located in van 42. Although many different types of sensors may be used, one that has been found to be particularly well suited is sold under the trademark KEYENCE, Model LS-7601, which includes the sensor heads 40 and a monitor (not shown) that feeds directly into computer 40. If the sucker rods 30 are being pulled from the oil well 12, the computer 40 will be initiated by pushing the start 96 shown in FIG. 6.

The pushing of the start 96 connects the computer 40 to the monitor (also called "control panel") of the sensor head 74. This allows measurements of the diameter to be received from the sensor head 74 as the sucker rod 30 is being pulled. Connection block 98 connects the computer 40 to sensor heads 74 to begin receiving measurements. As each sucker rod is pulled through the rod scanner 32, the sensor heads 34 contained inside of measuring device barrels 76 will to take measurements of all sections of each sucker rod as indicated by pulling block 100. If all of the diameters of what should be in the oil well are known, the measurements may be compared in comparitor 102 with information from a database table 104. If all measurements are within tolerance, particularly for the sucker rod guides 82, then the operators will continue to the next rod 106. However, if the sucker rod being measured does not meet the tolerances that are acceptable, the operator will be warned that one or more components of the sucker rod does not fall within the table of known specifications and it will be recommended that the sucker rod be laid down and replaced as illustrated by warning block 108.

If good data is not known for the particular oil well 12, or if the operator simply wants to verify the known data, then after the pulling block 100, a profile will be established of each sucker rod with the measurements received as is indicated by profile block 110. As indicated in profile block 110, the size of everything is measured, including the sucker rod, coupling and guides and, particularly, the outside diameter of each guide. The computer 40 is programmed to ignore transition areas such as flat wrench area 92, wrench square 88 or transition 86. Next, a profile of each rod will be established as indicated in the establish profile block 112. Once the profile has been established then, the comparitor 102 will compare with information from the database table 104 to determine if the sucker rod 30, sucker rod guides 82 and coupling 84 are all within tolerance. If they are, the sucker rod 32 is hung up inside of derrick 18 and the operator continues to the next rod 106. However, if the sucker rod 30, couplings 84 or sucker rod guides 82 are out of tolerance, a warning 108 will be given to the operator and recommend that the sucker rod be laid down and replaced. Normally, the part that will be measured out of tolerance is the sucker rod guide 82.

By repeating this procedure for each sucker rod 30 as it is removed from the oil well 12, a complete profile of all sucker rods in the oil well is established. Any that are out of tolerance will be replaced.

While the dimensions for a typical sucker rod 30, sucker rod guides 82 and coupling 84 are given, the computer 40 is programmed to measure other sizes as is established by the database table 104. The computer 40 can be programmed to accept less or more wear on the sucker rod guides 82.

While it is most common that the sucker rod guides 82 will wear and be out of tolerance, if the sucker rod guides 82 are completely worn out, there may also be wear on couplings, which will also have to be replaced. Also, a determination can be made as to whether additional sucker rod guides 82 should be inserted.

The invention claimed is:

1. An apparatus for measuring sucker rods, sucker rod guides and couplings in an oil well, comparing measurements with a known data base/table when reworking the oil well, a workover rig having a derrick and pulley to pull the sucker rods out of the oil well during the reworking, said apparatus comprising:
   a rod scanner encircling, and through which, said sucker rod is pulled during said reworking;
   a lower cleaning section of said rod scanner having a base plate;
   an upper instrument housing of said rod scanner attached to said lower cleaning section;
   a hole through the center of said lower cleaning section and said instrument housing of said rod scanner, said sucker rod being pulled through said hole;
   a wiper containment plate spaced above, and attached to, said base plate, said wiper containment plate having a wiper channel therein;
   a flexible wiper in said wiper channel, said flexible wiper pressing against and wiping to clean said sucker rod as said sucker rod is being pulled there through;
   a micrometer base plate above, and attached to, said wiper containment plate for holding said flexible wipe in position;
   sensor heads attached to said micrometer base plate with sensors therein being adjacent to said sucker rods, said sensors measuring diameters of said sucker rods, said sucker rod guides and said couplings as said sucker rod is being pulled;
   a computer containing said data base/table, said computer is programmed (1) to receive said diameters of said sucker rods, said sucker rod guides and said couplings from said sensors and (2) compare said diameters with standard diameters from said data base/table to determine if said sucker rod guides and said couplings are within acceptable tolerances;
   during said reworking, said derrick and said pulleys removing any of said sucker rods, said sucker rod guides or said couplings that are out of said acceptable tolerances.

2. The apparatus as given in claim 1 further comprises a top plate enclosing said upper instrument housing, said top plate pressing a measuring device barrel against said sensor heads to hold said sensor heads in position.

3. The apparatus as given in claim 2 wherein said computer is further programmed to establish a profile of each of said sucker rods when a known profile does not exist in said data base/table, said comparison of said diameters being between said established profile and said diameters as measured.

4. The apparatus as given in claim 3 wherein said computer is further programmed to ignore transition areas of said sucker rods being pulled.

5. A method of comparing diameters of sucker rods, sucker rod guides and couplings with a data base/table when pulling sucker rods during a workover of an oil well, said workover having an operator and including a derrick with pulleys to lift sucker rods, said method including the following steps:
   encircling said sucker rods with a rod scanner, said sucker rods being pulled through a hole in said rod scanner;
   cleaning said sucker rods during said pulling in a lower cleaning section of said scanner by wiping said sucker rods with a flexible wiper;
   mounting sensor heads in an upper instrument housing of said rod scanner so that signals from said sensor heads will be reflected by said sucker rod being pulled;
   comparing said signals as reflected in a computer storing said data base/table to determine if said sucker rod being pulled is within acceptable diameter tolerances; and
   warning said operator if said sucker rod being pulled is out of said acceptable diameter tolerances.

6. The method as given in claim 5 further includes:
   taking measurements of all sections of said sucker rod being pulled to establish a profile of all sections of said sucker rod; and
   analyzing said measurements to determine if all of said sections are within said acceptable diameter tolerances;
   said warning being given if any of said sections are not within said acceptable diameter tolerances.

7. The method as given in claim 6 includes repeating the preceding steps for each of said sucker rods being pulled.

* * * * *